(12) United States Patent
Kowarz et al.

(10) Patent No.: US 6,552,855 B1
(45) Date of Patent: Apr. 22, 2003

(54) IMAGE-FORMING SYSTEM WITH ENHANCED GRAY LEVELS

(75) Inventors: Marek W. Kowarz, Henrietta, NY (US); John C. Brazas, Jr., Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/184,280

(22) Filed: Jun. 27, 2002

Related U.S. Application Data

(62) Division of application No. 09/993,034, filed on Nov. 6, 2001.

(51) Int. Cl.[7] .............................................. G02B 27/10
(52) U.S. Cl. ...................................... 359/627; 359/618
(58) Field of Search ................................ 359/618, 627, 359/385, 387, 485, 487, 483; 382/162, 199, 181; 348/625, 252

(56) References Cited

U.S. PATENT DOCUMENTS 6,222,674 B1 * 4/2001 Ohta ........................ 359/618

* cited by examiner

Primary Examiner—Georgia Epps
Assistant Examiner—Omar Hindi
(74) Attorney, Agent, or Firm—Stephen H. Shaw

(57) ABSTRACT

An image-forming system with enhanced gray levels, including: a primary beam of light having a primary intensity value; a secondary beam of light having a secondary intensity value significantly less than the primary intensity value; a first modulator array of discrete devices receiving the primary beam of light and producing an output with coarse gray levels; a second modulator array of discrete devices receiving the secondary beam of light and producing an output with fine gray levels; a controller for synchronously controlling the first and the second modulator array; and optics that combine the output with fine gray levels and the output with coarse gray levels to form an image with the enhanced gray levels.

9 Claims, 10 Drawing Sheets

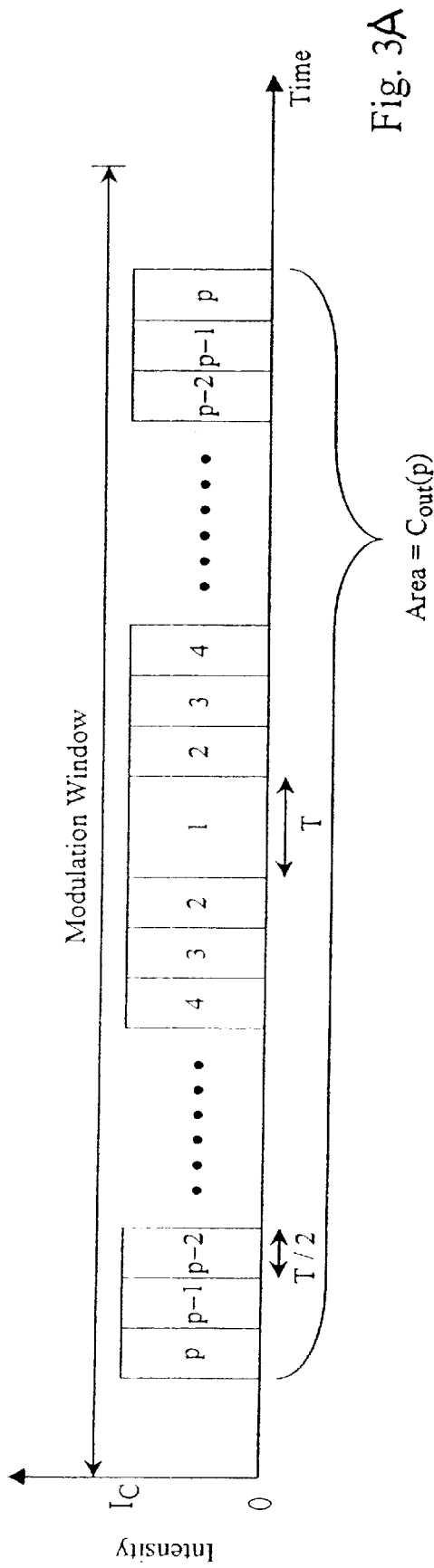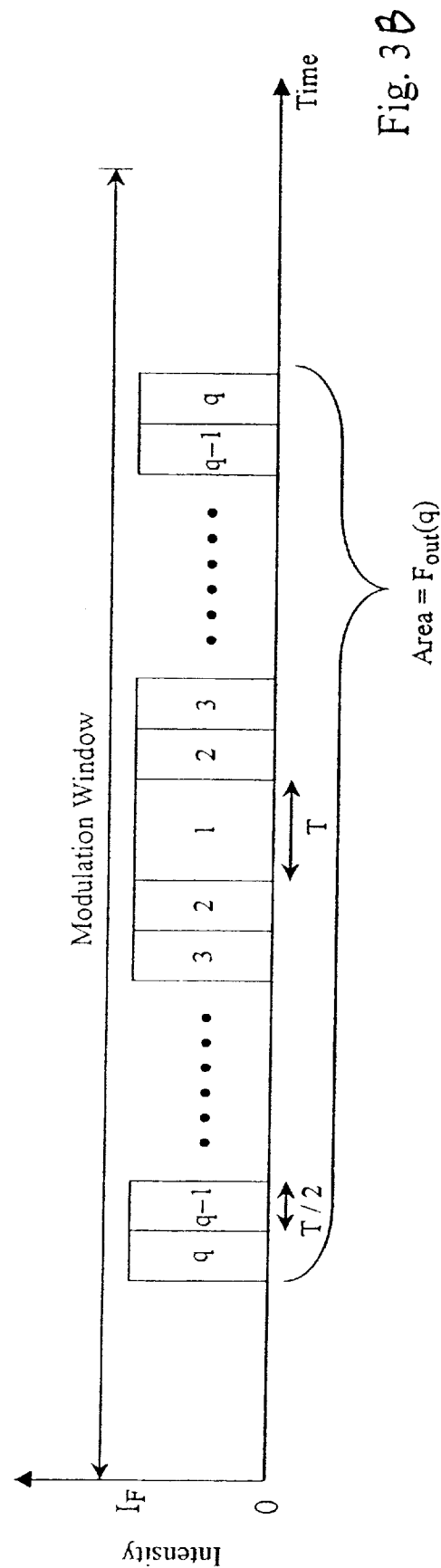

IMAGE-FORMING SYSTEM WITH ENHANCED GRAY LEVELS

This is a division of application Ser. No. 09/993,034, filed Nov. 6, 2001.

FIELD OF THE INVENTION

This invention relates to an image-forming system containing spatial light modulators that generate a visible image from an electronic signal. More particularly, the invention relates to a projection display system having enhanced gray levels for each pixel in the image.

BACKGROUND OF THE INVENTION

Many display systems, including projection and video type display systems, employ a uniformly illuminated spatial light modulator to convert electronic image information into an output image. At present in such systems, the light source is typically a white light lamp and the spatial light modulator is typically an area array containing liquid crystal devices or micromirror devices. Alternative display system architectures with one or more laser sources and spatial light modulators that are linear arrays of electromechanical grating devices show much promise for the future. To display high quality motion images, the individual devices of these different spatial light modulators must be capable of rapidly producing a large number of gray levels in the image. The limit on the number of possible gray levels is usually dictated either by the device dynamics or by the speed of electronics.

Prior inventions have disclosed schemes for increasing the number of gray-levels in the image without increasing the speed of the modulating elements or of the associated electronics. These schemes vary the illumination that is incident on the spatial light modulator during a frame. Specifically, according to U.S. Pat. No. 5,812,303, issued to Hewlett et al. on Sep. 22, 1998, entitled, "LIGHT AMPLITUDE MODULATION WITH NEUTRAL DENSITY FILTERS," additional gray levels can be obtained with a micromirror device by, using a variable neutral density filter to generate coarse and fine gray levels. The fine gray scale is obtained by attenuating the illumination for some time during the display of a frame. The coarse gray scale has no attenuation. In practice, the invention is implemented by rotating a filter wheel with a multi-segment neutral density filter in synchronization with the data stream.

An alternative approach employs a pulsating light source such as a pulsed laser to reduce speed requirements on the electronics, as described in U.S. Pat. No. 5,668,611, issued to Ernstoff et al. on Sep. 16, 1997, entitled "FULL COLOR SEQUENTIAL IMAGE PROJECTION SYSTEM INCORPORATING PULSE RATE MODULATED ILLUMINATION." The illumination on the spatial light modulator is adjusted by varying the pulse rate or pulse count. Moreover, the average brightness of the light source is determined by the number of pulses. A complementary method uses direct intensity modulation of the light source to obtain multiple levels of brightness, as disclosed in U.S. Pat. No. 5,903,323, issued to Ernstoff et al. on May 11, 1999, entitled "FULL COLOR SEQUENTIAL IMAGE PROJECTION SYSTEM INCORPORATING TIME MODULATED ILLUMINATION." Both U.S. Pat. Nos. 5,668,611 and 5,903,323 address the specific problem of having a large enough time window for the electronics to load new image data bits into the spatial modulator.

Each of the above described inventions trade light source efficiency for improved gray levels or reduced electronic speed requirements. However, efficient use of the light source is needed for theater-type projection displays in order to maximize brightness and color saturation of the projected image.

The display systems described in the prior art achieve fine gray level control by lowering the average optical power incident on the spatial light modulator for some period of time, thus generating multiple illumination levels corresponding to decreased intensity. Multiple illumination levels reduce the speed requirements of the spatial light modulator and its associated electronics. However, a serious technical drawback to this approach is that it wastes optical power that is available from the light source during lower illumination intervals. There is a need, therefore, for a display system having fine gray level control while simultaneously making efficient use of available optical power.

SUMMARY OF THE INVENTION

The above need is met according to the present invention by providing an image-forming system with enhanced gray levels that includes a first light source that can emit a primary beam of light having a primary intensity value; a second light source that can emit a secondary beam of light having a secondary intensity value significantly less than the primary intensity value; a first modulator array of discrete devices receiving the primary beam of light and producing an output with coarse gray levels, a second modulator array of discrete devices receiving the secondary beam of light and producing an output with fine gray levels; a controller for synchronously controlling the first and the second modulator array; and optics that combine the output with fine gray levels and the output with coarse gray levels to form an image with the enhanced gray levels.

DETAILED DESCRIPTION OF THE INVENTION

Figure 1:
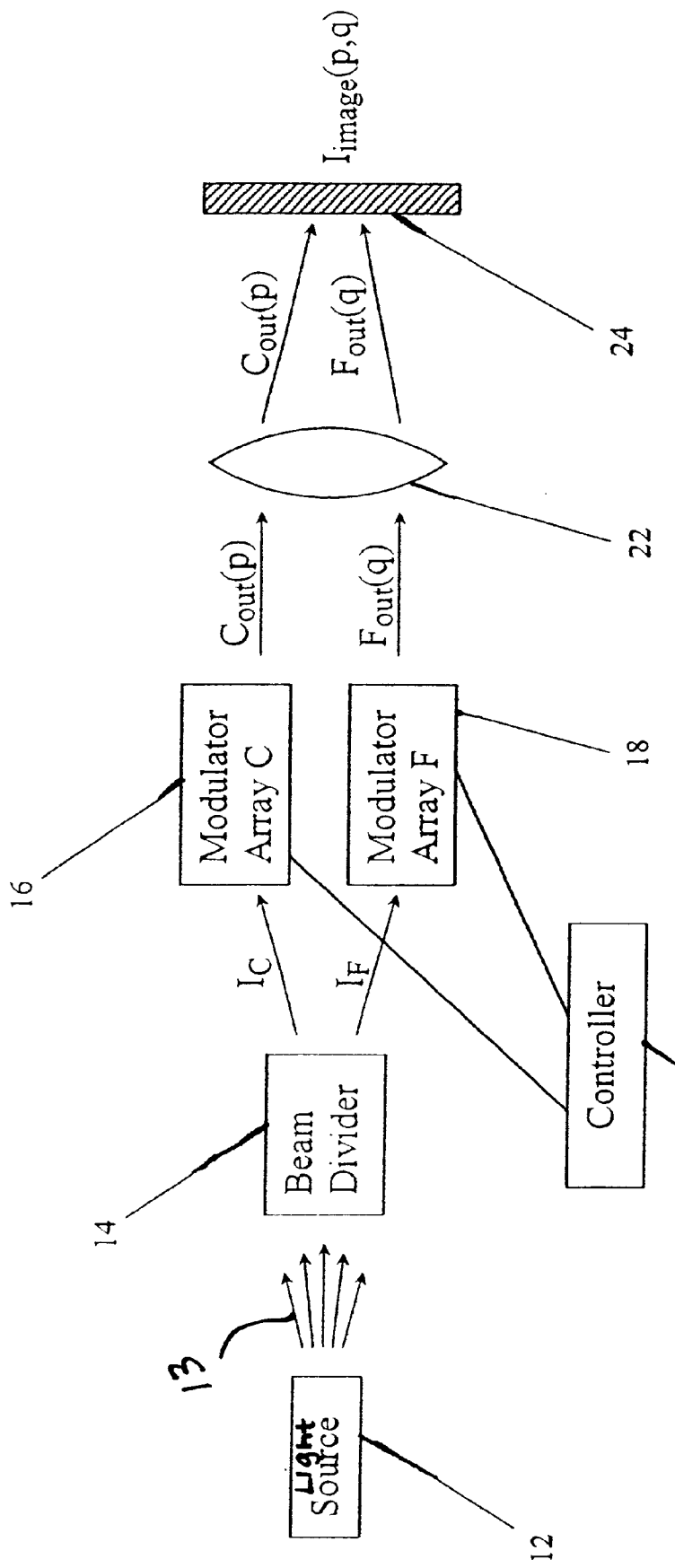
FIG. 1 is a block diagram of an image-forming system with two spatial light modulators, illuminated by two different intensity levels $I_C$ and $I_F$.

FIG. 1 shows a block diagram of a system for forming an image with very fine intensity levels or gray levels. This image-forming system could be, for example, a digital cinema projector, a rear-projection HDTV or a silver halide printer. The system contains two spatial light modulators: modulator array C 16; and modulator array F 18. Both modulator arrays 16, 18, are illuminated unequally by a primary and a secondary beam having intensities $I_C$ and $I_F$, respectively. As a convention, if $I_C$ is chosen to be greater than $I_F$, modulator array C 16 generates coarse gray levels and modulator array F 18 generates fine gray levels. To produce the primary and secondary illumination beams, the source beam 13 produced from a light source 12 is divided unequally by a beam divider 14, which may be a simple beam splitter or a grating. The beam divider 14 could also consist of a waveplate followed by a polarization beamsplitter. As will be described later, polarization-based division allows the ratio of the two intensities $I_C$ and $I_F$ to be tuned to a desired value. A variety of different spatial light modulator technologies may be used for the two modulator arrays, for example, liquid crystal panels, micromirror arrays such as the digital mirror device (DMD) from Texas Instruments or electromechanical grating arrays. The spatial light modulators may modulate light through pulse width modulation, amplitude modulation or any other approach for attenuating the incident illumination to produce gray levels in the image. A controller 20 sends code values to each of the two spatial light modulators (modulator array C 16, and modulator array F 18) to generate the desired pixel gray levels. The light output from the coarse and fine modulators, $C_{out}(p)$ and $F_{out}(q)$, is then collected by imaging optics 22 and directed to an image plane 24, where an image with intensity $I_{image}(p, q)=C_{out}(p)+F_{out}(q)$ is formed. The code values p and q are used to select the intensity for a given pixel in the image. (In this notation, the spatial dependence of $I_{image}(p, q)$, $C_{out}(p)$ and $F_{out}(q)$ is implicit.) It should be pointed out that, for coherent light sources, interference can occur between the two beams in the image. In the preferred embodiment, the interference effects are avoided by having the light output from the two modulators orthogonally polarized.

Figure 2A:
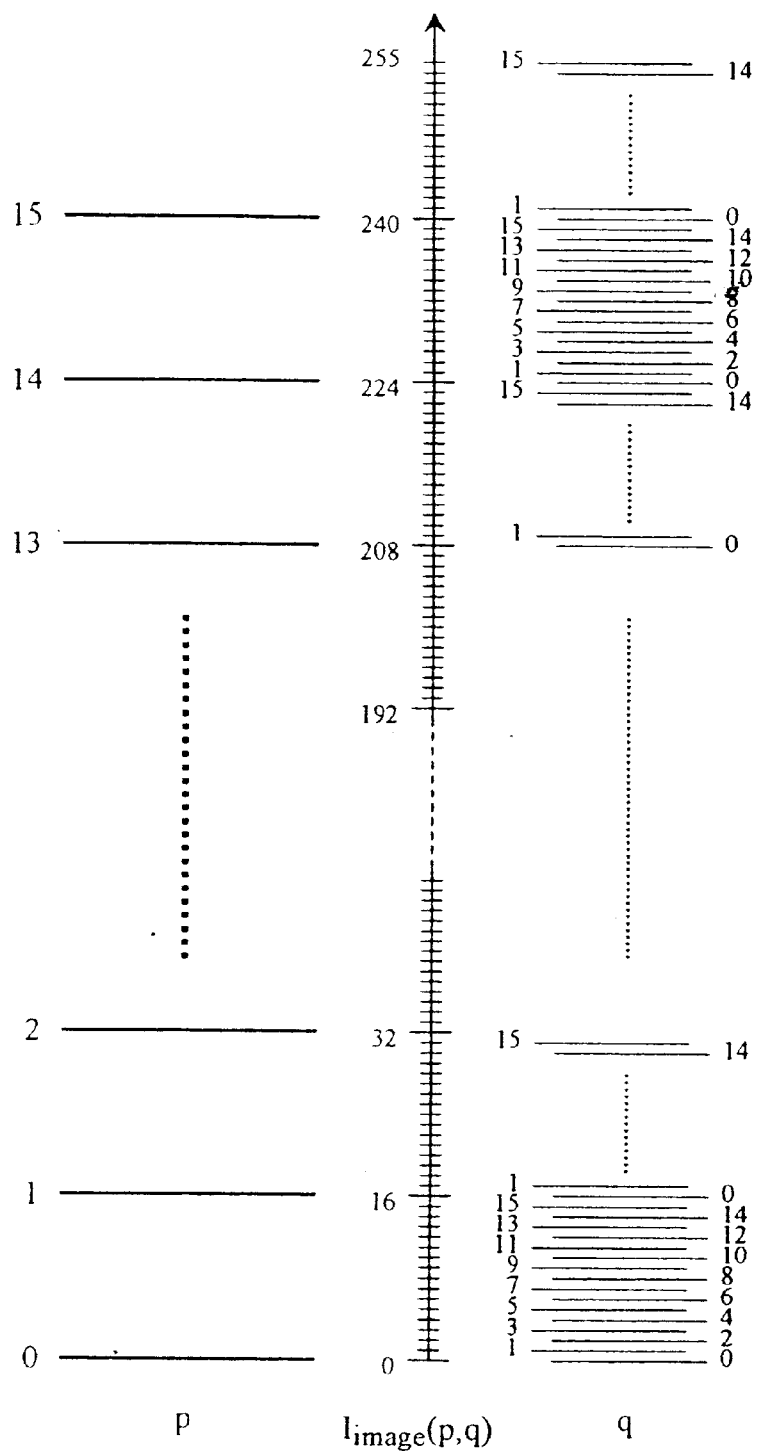
FIG. 2A illustrates the formation of image gray levels $I_{image}(p, q)$ by combining the coarse light output levels from array C with the fine levels from array F, when there is no overlap between the coarse and fine levels.

FIG. 2A illustrates the formation of fine gray levels in the image. For simplicity, in this illustration, the pixel intensity in the image $I_{image}(p, q)$ has 8 linear bits or 256 levels, whereas the modulator arrays F 18 and C 16 of FIG. 1 each have only 4 linear bits or 16 levels. The light output of coarse and fine modulator arrays is linearly dependent on the code value p and q, respectively. In this example, p and q can take on values between 0 and 15. In practice, 12 or more linear bits are required in a high quality image and the modulation may be a non-linear function of code value. The ratio of the fine and coarse illumination in FIG. 2a, where the number of linear bits equals 4, is chosen to be $I_F/I_C=1/16$ so that there is no overlap between the two scales or redundancy in $I_{image}(p, q)$ for any combination of code values p and q.

More generally, by using the two unequally-illuminated modulators to generate coarse and fine levels, it is possible to increase the number of gray levels from $2^N$ to $2^{2N}$, N being the number of linear bits for a single modulator. The illumination ratio is then chosen to be $I_F/I_C=1/2^N$. In a practical implementation, it is difficult to achieve and maintain this exact ratio. Therefore, a better choice is $I_F/I_C>1/2^N$, which allows for some overlap between the pixel intensities on the coarse and fine scales. The overlap also provides some headroom for calibration between the two gray scales.

Figure 2B:
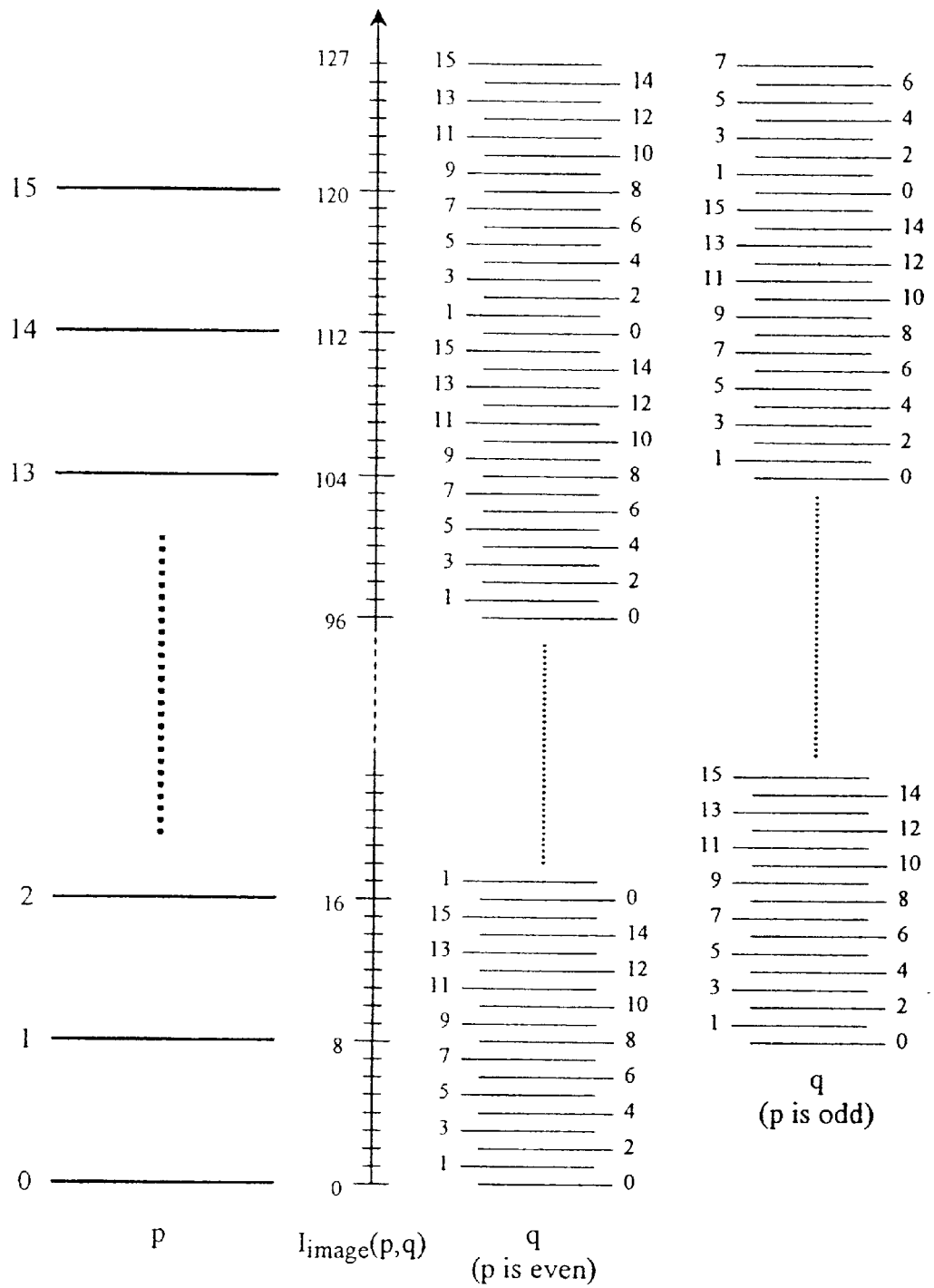
FIG. 2B illustrates the formation of image gray levels $I_{image}(p, q)$ when there is overlap between the coarse light output levels from array C and the fine levels from array F.

FIG. 2B is an example similar to FIG. 2A except that the ratio of the fine and coarse illumination is chosen to be $I_F/I_C=1/2^{N-1}=1/8$, N=4, so that there is both overlap and redundancy in $I_{image}(p, q)$ for combinations of code values p and q. For example, $I_{image}(0, 8)=I_{image}(1, 0)$ and, more generally, $I_{image}(p, q)=I_{image}(p+1,q-8)$. Because of the redundancy, the pixel intensity in the image $I_{image}(p, q)$ has 7 linear bits or 128 possible gray levels.

Figure 3A:
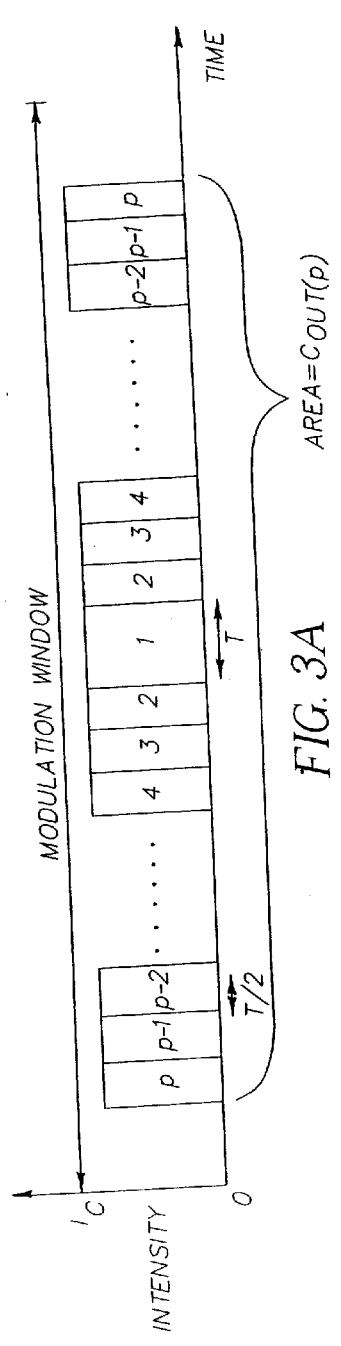
FIG. 3A illustrates the generation of coarse light output levels $C_{out}(p)$ by array C through pulse width modulation.
Figure 3B:
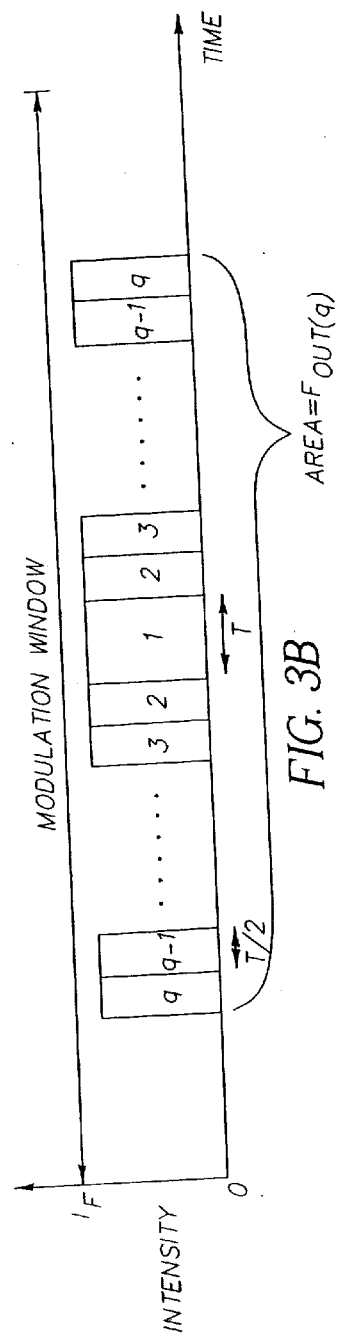
FIG. 3B illustrates the generation of fine light output levels $F_{out}(q)$ by array F through pulse width modulation.
Figure 4:
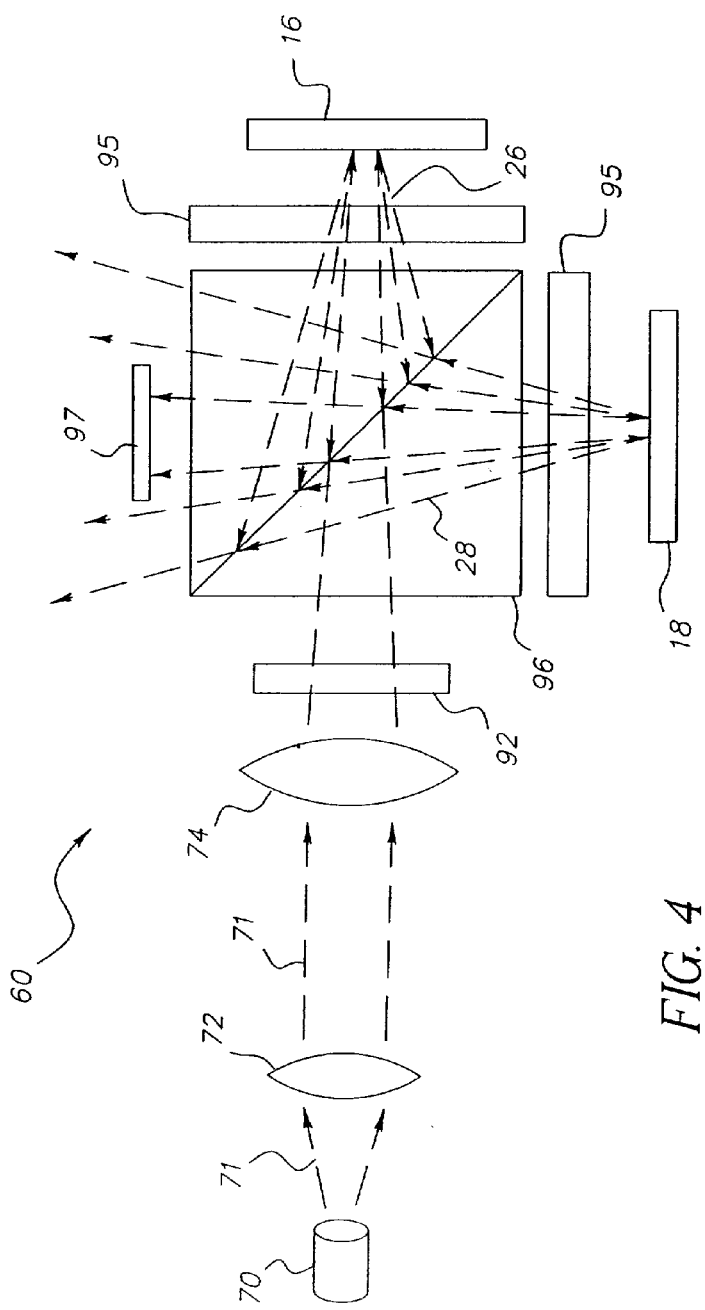
Figure 6:
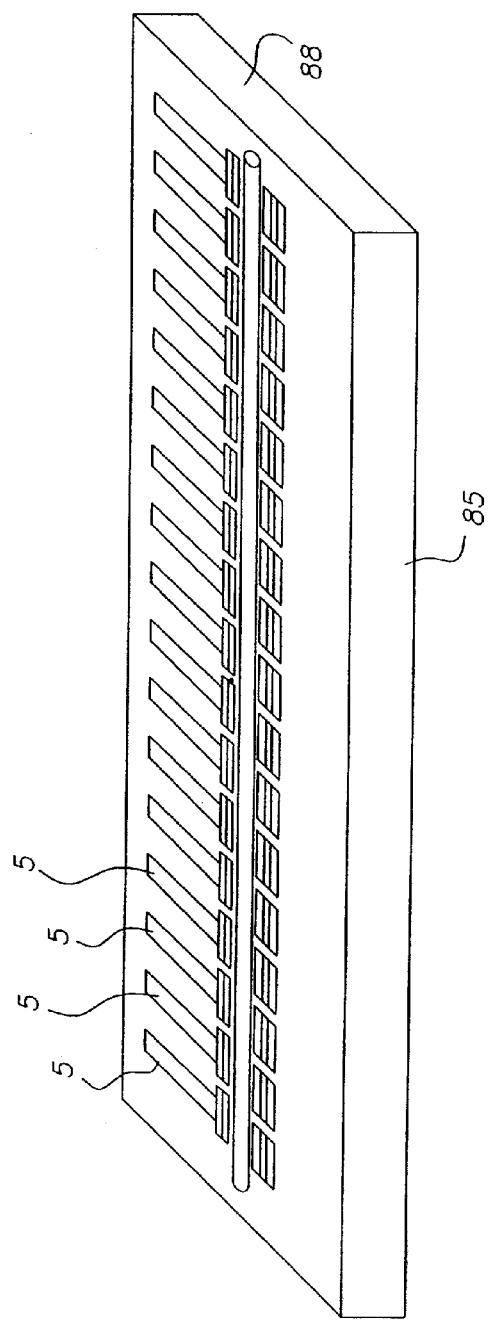
Figure 7:
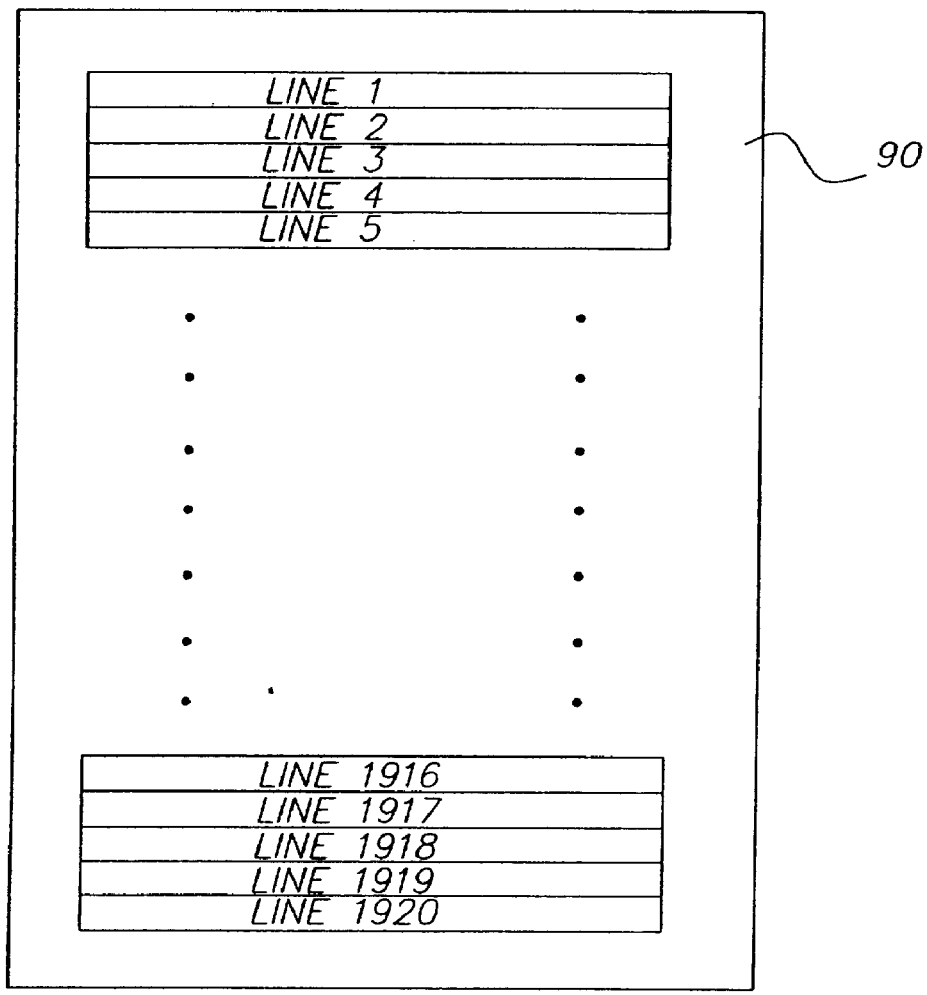
Figure 8:
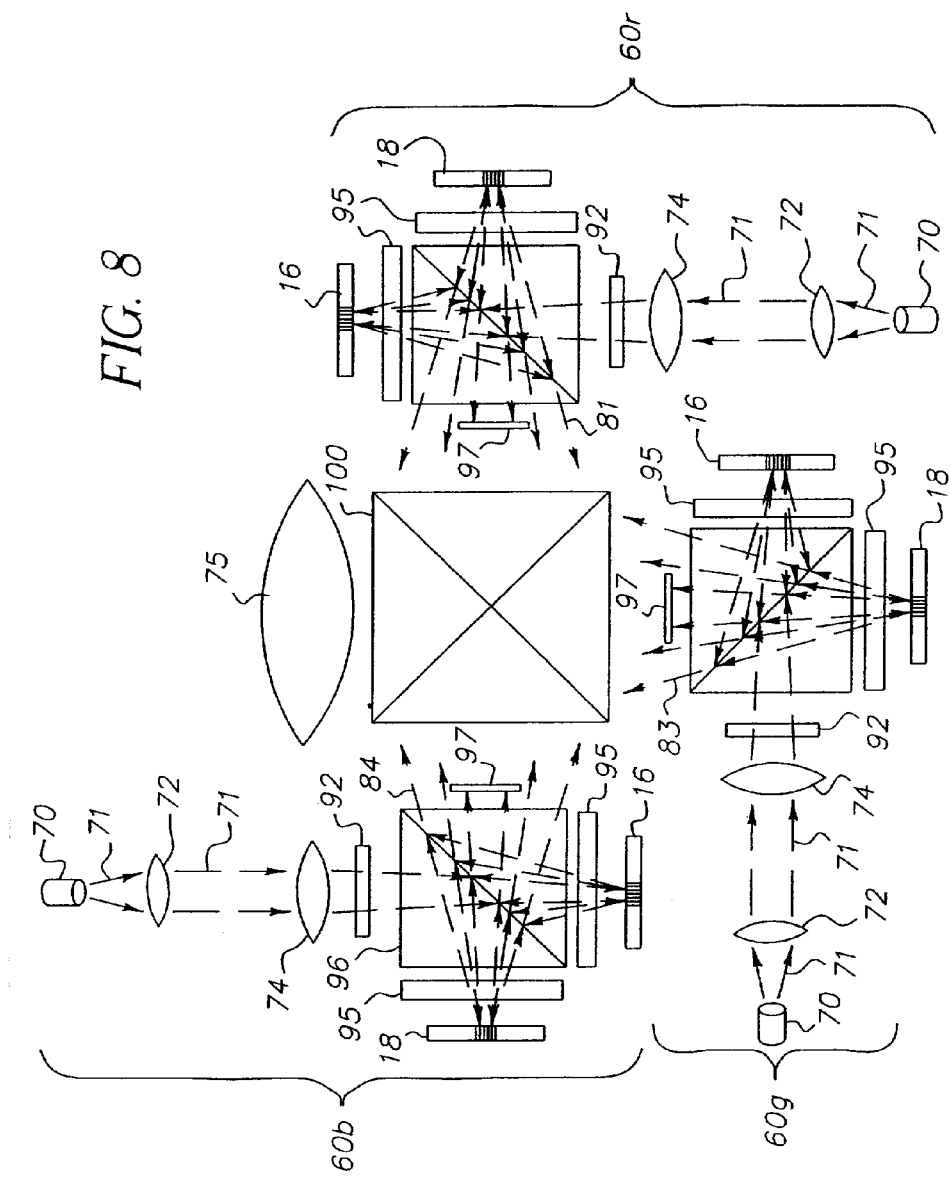
Figure 9:
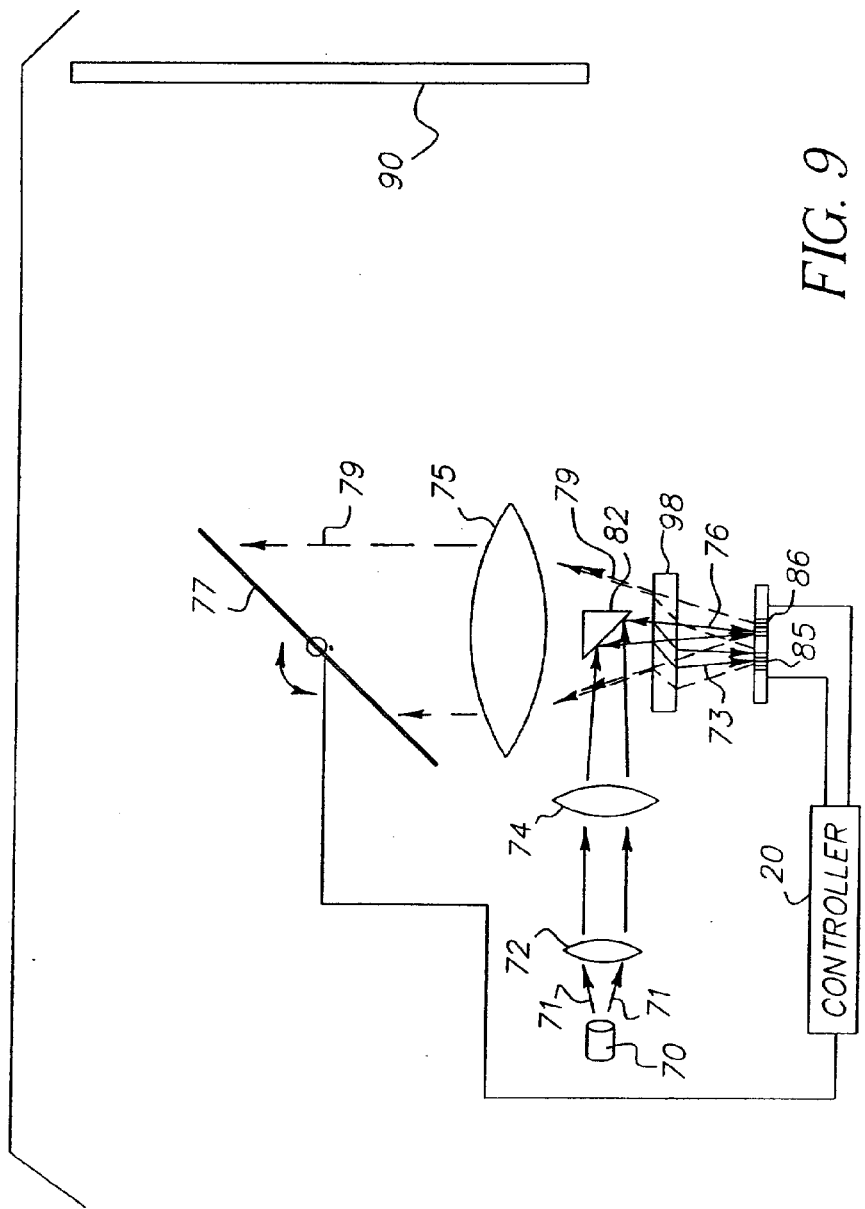

FIGS. 3A and 3B illustrate the formation of the coarse and fine outputs $C_{out}(p)$ and $F_{out}(q)$, by a pair of spatial light modulators that use center-weighted pulse width modulation to produce gray levels. The modulators are on for an integer multiple of the least significant bit time (T) determined by the code values p and q. The upper limit on p and q is determined by the modulation window. For area arrays, the modulation window is simply the time available to display a single frame. For linear arrays, it is the time available to generate a single line of an image during a scan of multiple sequential lines to produce a single frame. The outputs $C_{out}(p)$ and $F_{out}(q)$ are equal to the corresponding integrated intensities within a modulation window.

Figure 4:
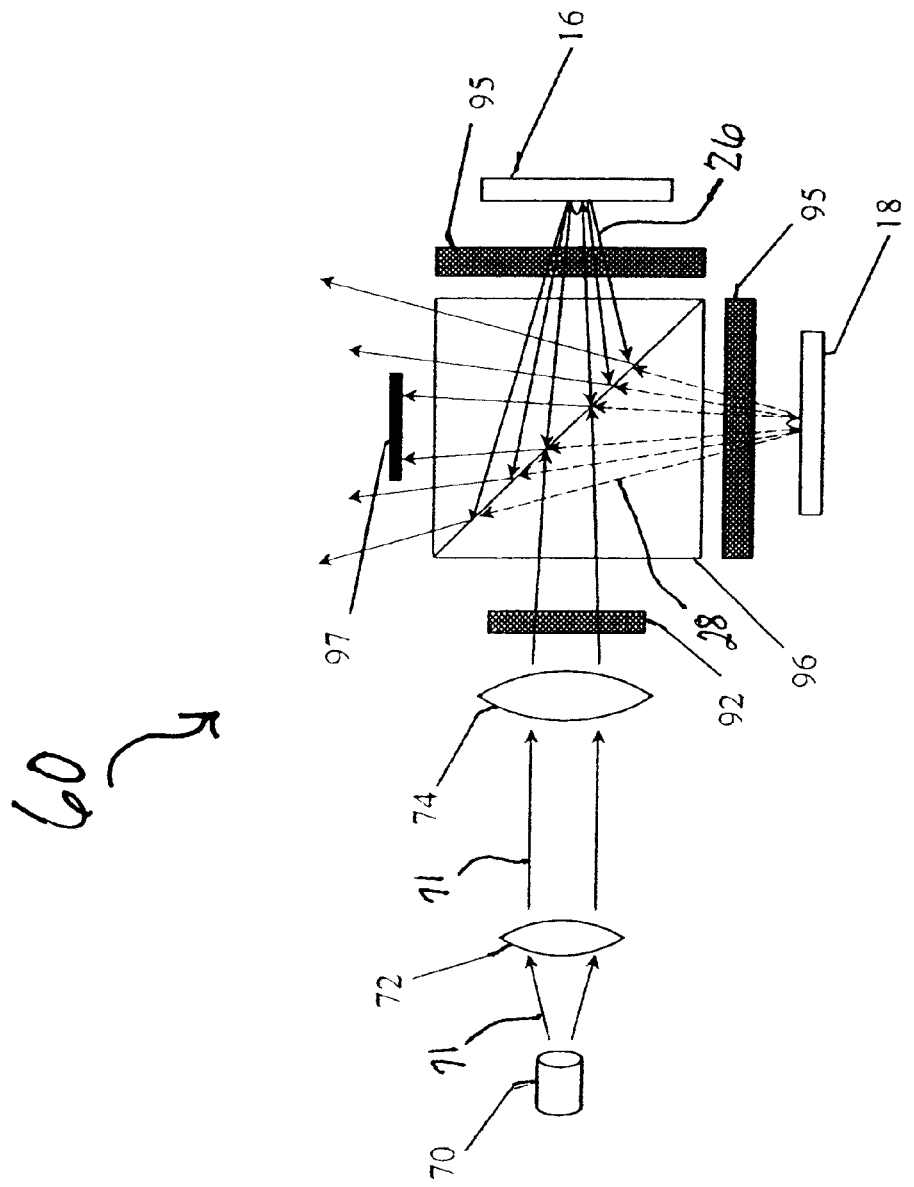
FIG. 4 is a schematic illustrating an optical sub-system for illuminating two spatial light modulators unequally and recombining the modulated light output.

FIG. 4 shows an optical sub-system 60 that can be used to implement beam division, illuminate two modulator arrays, and recombine the outputs of the modulator arrays. In this embodiment, the source 70 is preferably a linearly polarized laser that emits a narrow spectrum of light, commonly referred to as a light beam 71. The light beam 71 is conditioned by first and second conditioning lens 72 and 74, respectively, and passes through a half-wave plate 92, which can be rotated to adjust the state of polarization. A polarization beam splitter 96 splits the beam into its horizontally and vertically polarized components. These orthogonally polarized components are the coarse light beam 26 and fine light beam 28, with intensities $I_C$ and $I_F$, respectively, needed to illuminate the two respective modulator arrays 16 and 18. The modulator arrays 16 and 18 used in this embodiment are electromechanical grating devices that increase the light in diffracted orders when activated and consist of enough array elements to create an image. The ratio $I_F/I_C$ is determined by the orientation of the half-wave plate 92. A quarter-wave plate 95 is inserted in each arm of the optical sub-system 60 between the polarization beam splitter 96 and the two modulator arrays 16 and 18. As is well known in optical engineering, a polarization beam splitter with a quarter-wave plate in front of a reflecting surface serves as an optical isolator. Linearly polarized light transmitted (reflected) by the interface of the polarization beam splitter 96 will be reflected (transmitted) by the interface if the polarization is rotated 90 degrees. Double passage of light through the quarter-wave plate 95 produces the needed 90-degree polarization rotation. In FIG. 4, this approach is used to combine the outputs of the coarse and fine modulators 16 and 18 at the interface of the polarization beam splitter 96. Depending on the state of each array element, the light exiting the polarization beam splitter 96 is either blocked by a stop 97 or, when the array elements are activated, transmitted through imaging optics to the image plane (not shown). Interference artifacts are avoided because the coarse light beam 26 and the fine light beam 28 from the coarse and fine modulators 16 and 18, respectively, are orthogonally polarized.

The modulators of FIG. 4 can be micromirror arrays, electromechanical grating arrays, or any spatial light modulators that do not substantially alter the polarization.

Figure 5:
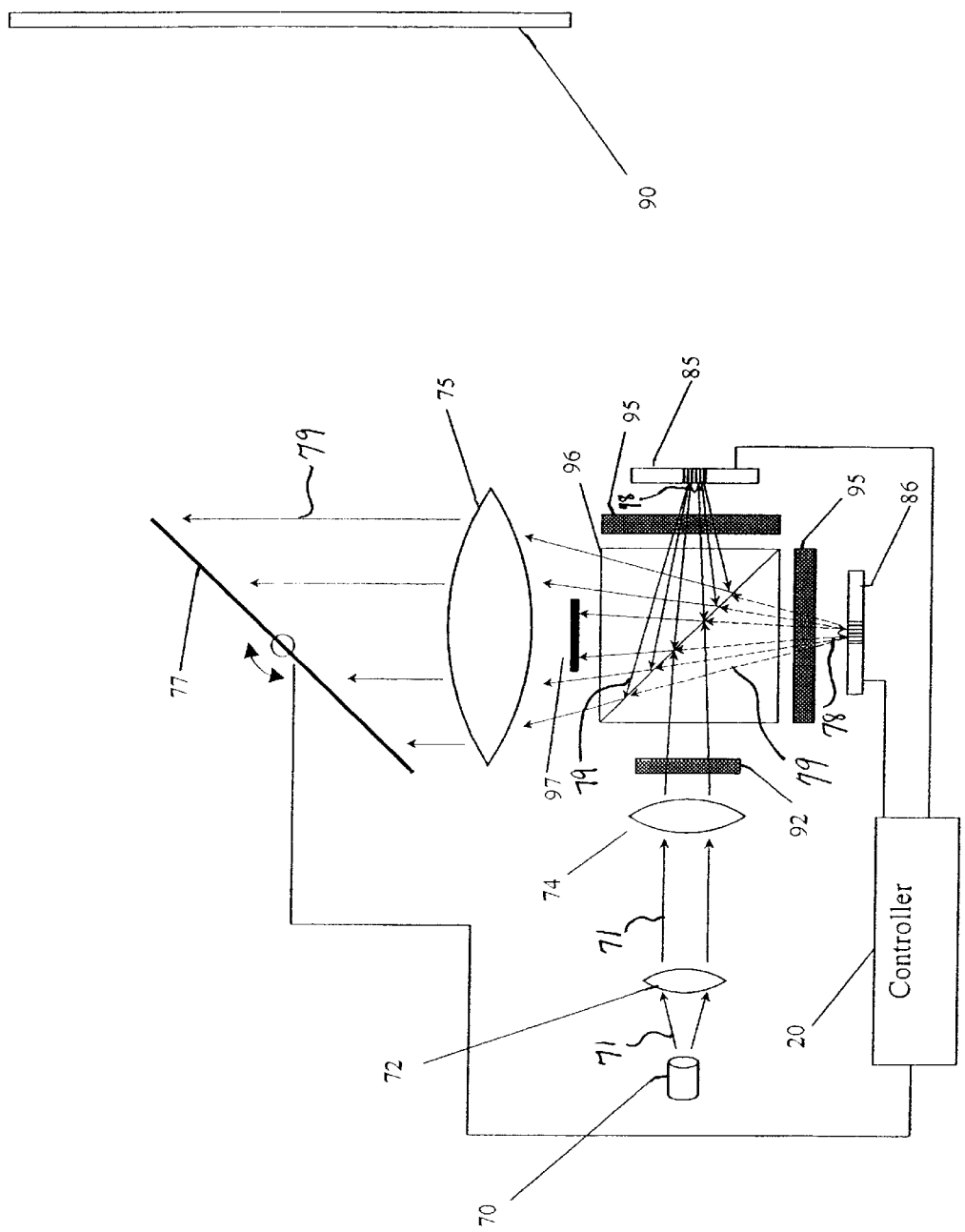
FIG. 5 is a schematic illustrating a line-scanned display system with two linear arrays of electromechanical grating devices, which are illuminated by two different intensity levels.
Figure 6:
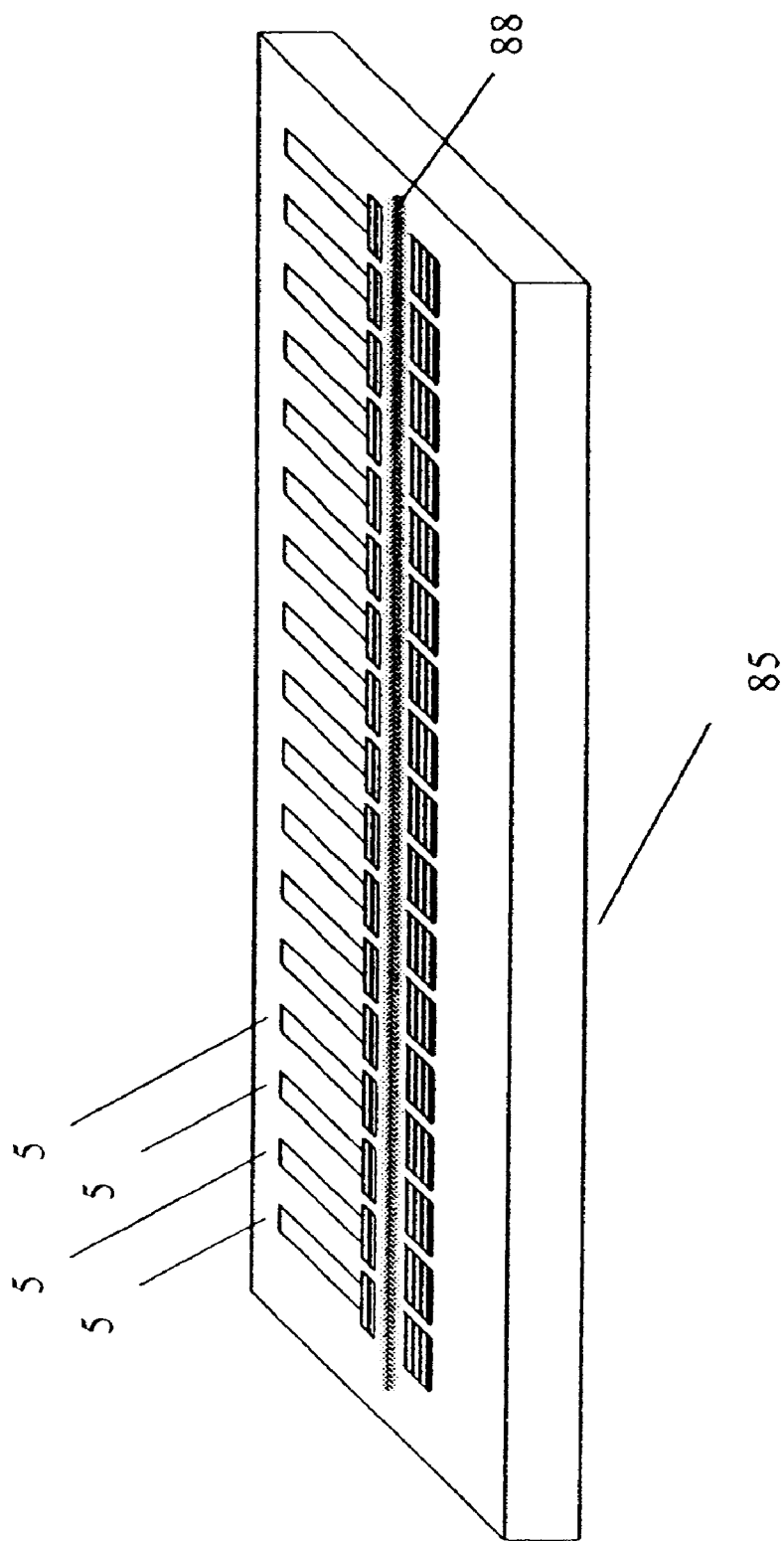
FIG. 6 shows a linear array of electromechanical grating devices illuminated by a line of light.
Figure 7:
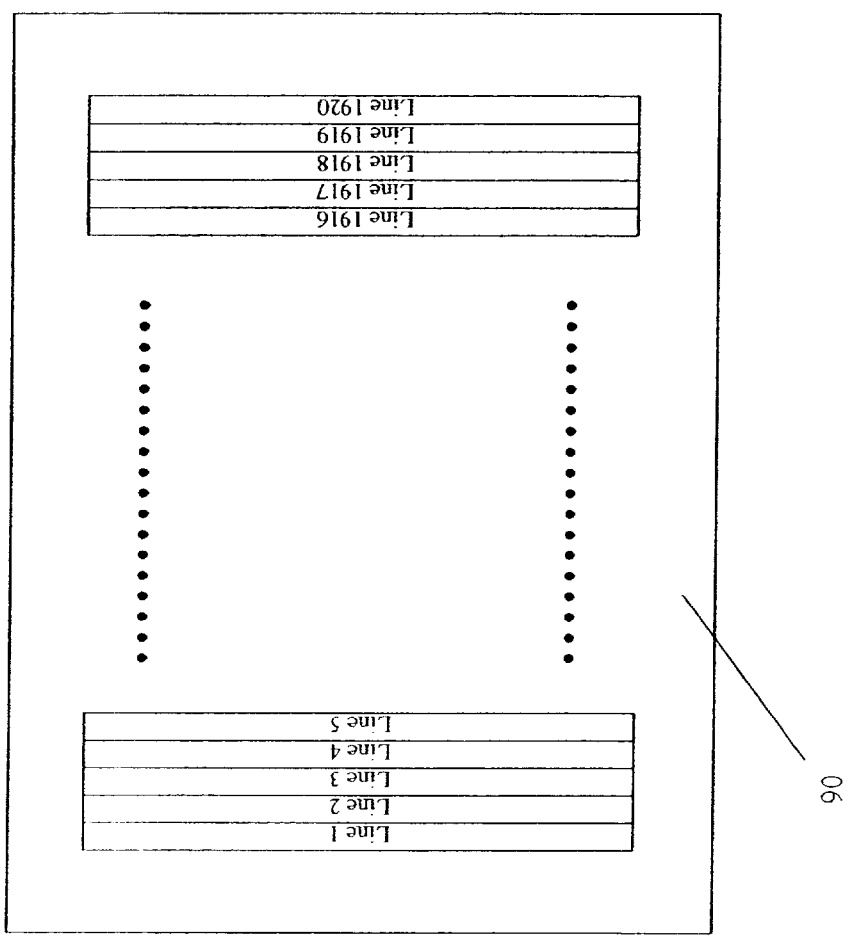
FIG. 7 is a view of the projection screen that illustrates the formation of a two-dimensional image by scanning a line image across the screen.

FIG. 5 shows a digital projection display that incorporates the optical sub-system 60 from FIG. 4. The two modulator arrays are now linear arrays of electromechanical grating devices (referred to hereinafter as first modulator array 85 and second modulator array 86), such as the conformal Grating ElectroMechanical System (GEMS) made by Eastman Kodak Company (see U.S. patent application Ser. No. 09/491,354 by Kowarz, filed Jan. 26, 2000, entitled, "SPATIAL LIGHT MODULATOR WITH CONFORMAL GRATING ELEMENTS," now U.S. Pat. No. 6,307,663, and U.S. patent application Ser. No. 09/867,927 by Kowarz et al., filed May 30, 2001, entitled, "METHOD FOR MANUFACTURING A MECHANICAL CONFORMING GRATING DEVICE"), or the grating light-valve made by Silicon Light Machines (see U.S. Pat. No. 5,982,553 issued to Bloom et al. on Nov. 9, 1999, entitled, "DISPLAY DEVICE INCORPORATING ONE-DIMENSIONAL GRATING LIGHT-VALVE ARRAY.") Modulator array 85 and 86 may be of the conformal type and may be linear. The controller 20 in FIG. 5 actuates the first modulator array 85 and the second modulator array 86 to obtain the desired pixel pattern for a given line of a two-dimensional image. The scheme illustrated in FIGS. 2A, 2B, 3A, and 3B can be used to obtain the required gray levels on the screen 90 for conformal GEMS devices designed for pulse-width modulation. If a particular conformal GEMS device is not actuated, it diffracts the incident light beam primarily into the 0th order light beam (i.e., reflecting the incident light beam 78), which is blocked by a stop 97. If the device is actuated, it diffracts the incident light beams 78 primarily into $+2^{nd}$, $+1^{st}$, $-1^{st}$ and $-2^{nd}$ order light beams. These diffracted light beams 79 pass around the stop 97 and are projected on the screen 90 by the projection lens system 75. The scanning mirror 77 sweeps the line image across the screen 90 to form the two-dimensional image. The controller 20 provides synchronization between the sweep of the scanning mirror 77 and data for each line. The scanning mirror 77 is preferably placed near the Fourier plane of the projection lens system 75 to minimize its size and mass. FIG. 6 depicts a first modulator array 85 of a conformal GEMS device 5 illuminated by a line of light 88. In practice, there would be hundreds or thousands of such devices. FIG. 7 is a view facing the screen 90 showing the formation of a two-dimensional image from a series of 1,920 sequential line scans.

The display system in FIG. 5 could be either monochromatic or color-sequential. In a color-sequential system, the controller 20 also synchronizes the color that illuminates the first modulator array 85 and the second modulator array 86, and the associated data for each line. Better utilization of available optical power and better image quality may be obtained by combining three optical sub-systems 60r, 60g and 60b into a system capable of displaying RGB simultaneously. This approach is shown in FIG. 8 where a color combining cube 100 (X-cube) is used to direct the red, green and blue outputs, 81, 83, and 84, respectively, through the projection lens system 75 and onto a screen (not shown).

Figure 8:
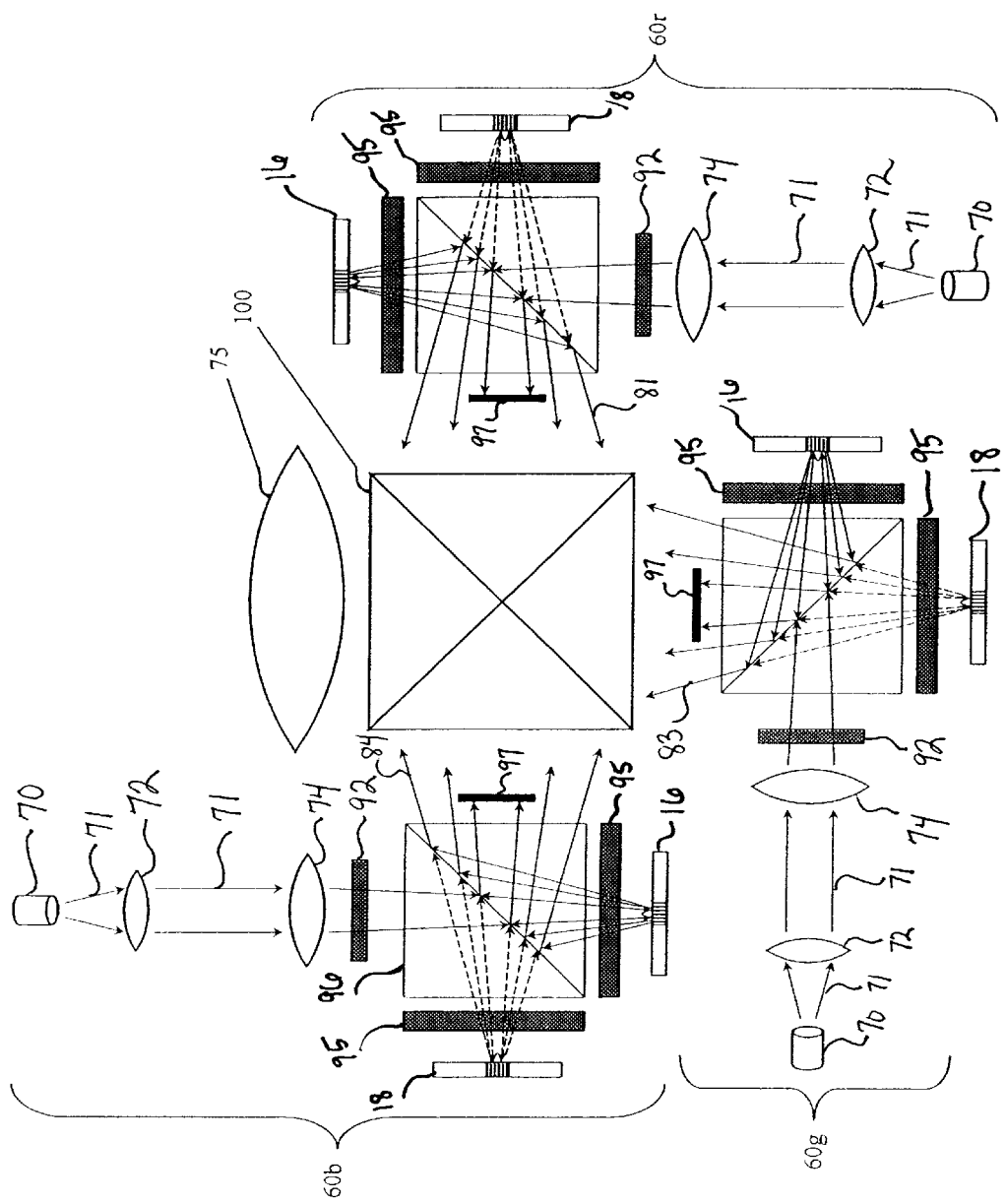
FIG. 8 is a schematic illustrating a color line-scanned display system with two linear arrays of electromechanical grating devices for each color.

It is instructive to compare the implications of the invention for a digital cinema system that contains a single linear array of conformal GEMS devices per color with the system shown in FIG. 8 that has a pair of linear arrays per color, which generate coarse and fine gray levels. In this example, the system is chosen to have HDTV resolution with 1,920 scanned lines (1,080 by 1,920 pixels), a frame rate of 60 Hz and a gray scale capability of 13 linear bits per color per frame (8,192 gray levels). The gray scale is obtained by pulse width modulation as explained in the description of FIGS. 3A and 3B. For the case of a single linear array per color, the least significant bit time must be somewhat less than 1/(1,920*60*8,192) seconds=1.06 nanoseconds to allow for some scanning overhead. The digital electronics in the controller must, therefore, be capable of generating a clock for the pulse width modulation operation of approximately 1 GHz. This clock frequency can be reduced substantially by implementing the system with two linear arrays per color, while maintaining the final system specifications. Specifically, a system having 13 linear bits per color per frame can be obtained with two linear arrays, each having 7 linear bits per color per frame. The ratio of the fine and coarse illumination is chosen to be $I_F/I_C = 1/2^{7-1} = 1/64$ so that there is both overlap and redundancy in the image gray levels. The requirement on T increases to 1/(1,920*60*128) seconds=67.8 nanoseconds and the clock requirement for the pulse width modulation operation drops to a very reasonable 14.7 MHz. The increased optical complexity of the display system in FIG. 8, therefore, significantly reduces the clock speed for the digital electronics.

Figure 9:
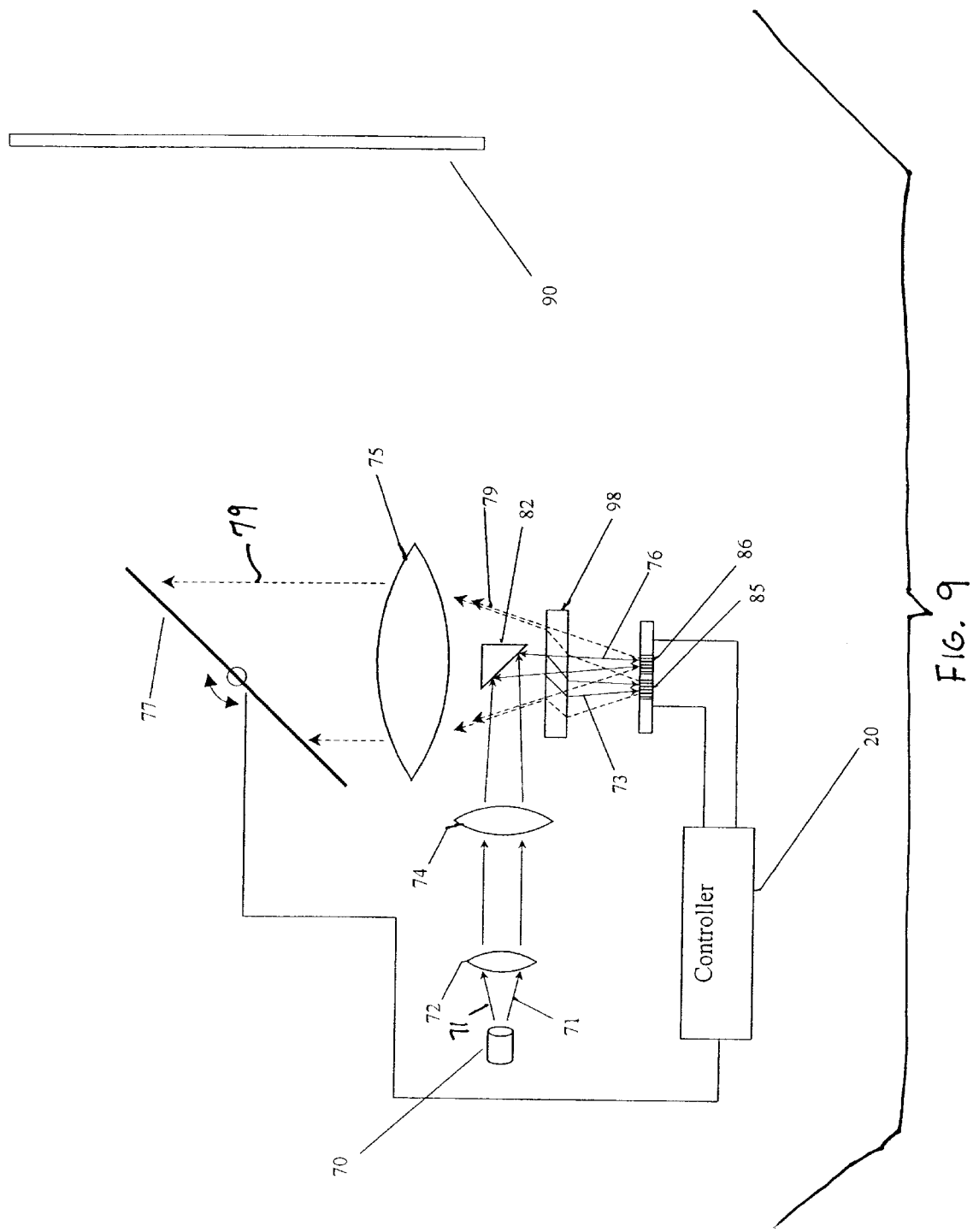
FIG. 9 is a schematic illustrating a line-scanned display system with two linear arrays of electromechanical grating devices on the same substrate, illuminated by two different intensity levels.
Figure 1:
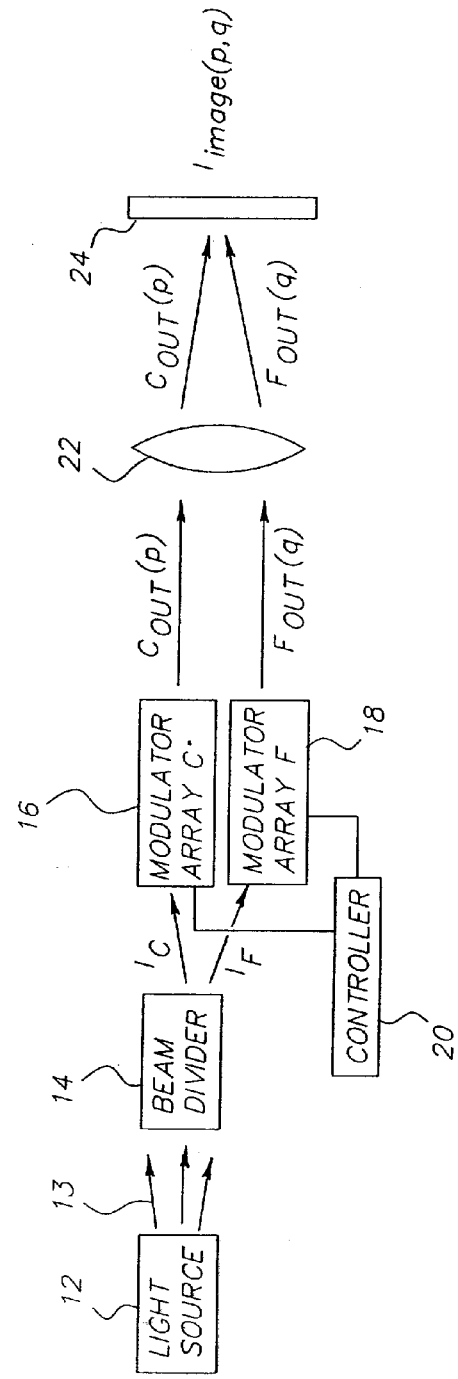
Figure 2A:
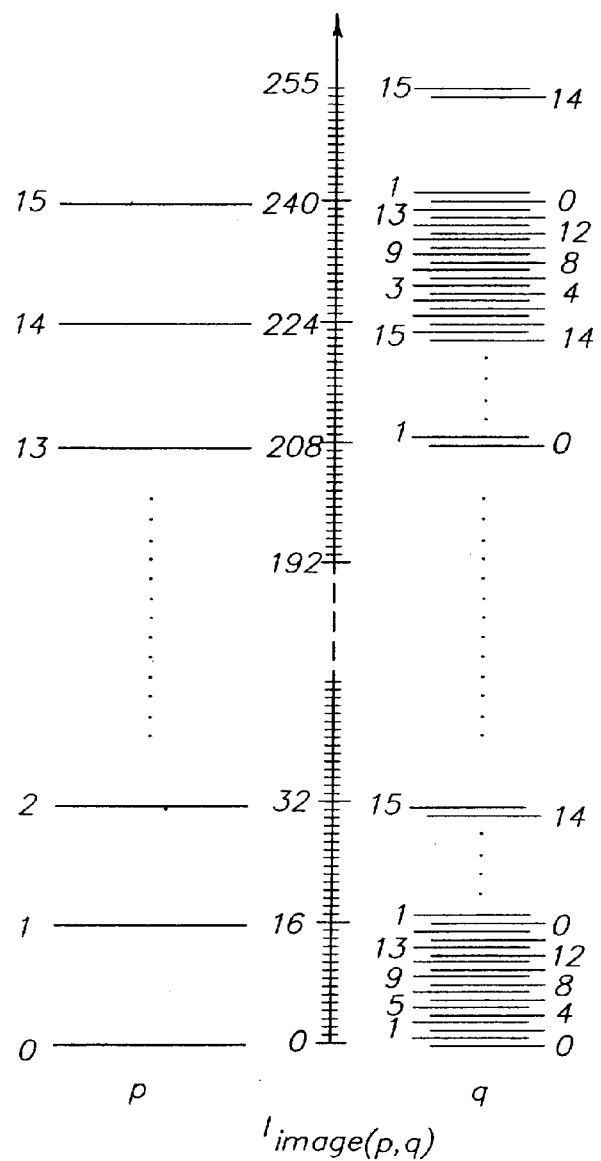
Figure 2B:
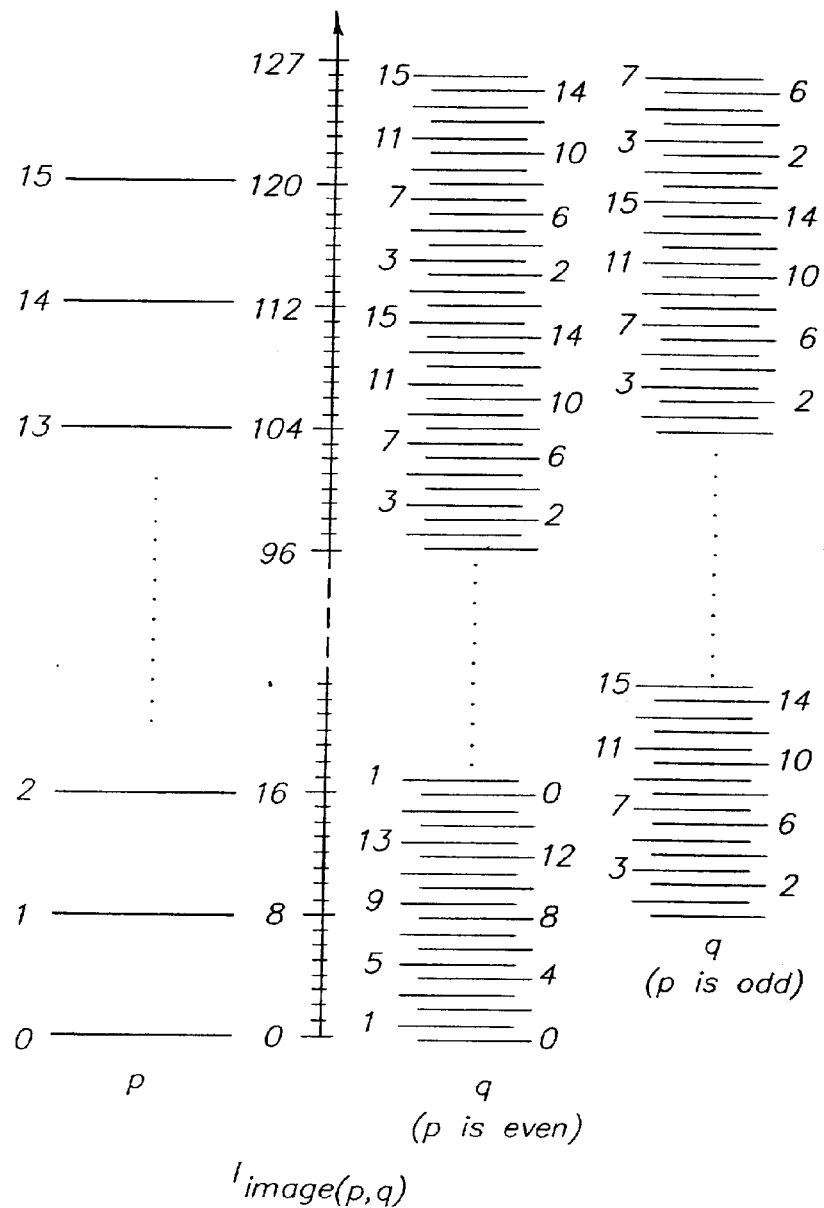

In the above embodiments, the two spatial light modulators for generating coarse and fine gray levels are physically separated in the system. A more compact system has both modulators on the same substrate. This configuration is illustrated in FIG. 9 for a display system similar to the system of FIG. 5. The two modulators are linear modulator arrays 85 and 86, respectively, of high-speed devices such as conformal GEMS. The conditioning lenses 72 and 74 produce a converging beam a turning mirror 82 redirects the beam toward the beam divider 98. The beam divider 98 splits an input light beam 71 from the laser 70 into two output beams 73 and 76 that are slightly separated and have a desired ratio of intensities. The beams 73 and 76 illuminate the first modulator array 85 and the second modulator array 86, respectively, that generate the coarse and fine gray levels. For a linearly polarized input beam, this beam divider 98 could be a polarization beam splitter plate made from a uniaxial crystal. The desired intensity ratio is then obtained by appropriately rotating the linear polarization of the input light beam 71. The diffracted light beam 79 from the modulator arrays 85 and 86 return through the beam divider 98 and become collinear. Interference artifacts that might result from combining coherent optical light beams are avoided because the diffracted light beams 79 exiting from modulator arrays 85 and 86 are orthogonally polarized.

The invention has been described in detail with particular reference to certain preferred embodiments thereof, but it will be understood that variations and modifications can be effected within the spirit and scope of the invention.

Parts List

| | |
|---|---|
| 5 | conformal GEMS device |
| 12 | light source |
| 13 | source beam |
| 14 | beam divider |
| 16 | coarse modulator array C |
| 18 | fine modulator array F |
| 20 | controller |
| 22 | imaging optics |
| 24 | image plane |
| 26 | coarse light beam |
| 28 | fine light beam |
| 60 | optical sub-system |
| 60r | red optical sub-system |
| 60b | blue optical sub-system |

-continued

| | |
|---|---|
| 60g | green optical sub-system |
| 70 | laser |
| 71 | light beam |
| 72 | first conditioning lens |
| 73 | output beam |
| 74 | second conditioning lens |
| 75 | projection lens system |
| 76 | output beam |
| 77 | scanning mirror |
| 78 | incident light beam |
| 79 | diffracted light beams |
| 81 | red output |
| 82 | turning mirror |
| 83 | green output |
| 84 | blue output |
| 85 | first modulator array |
| 86 | second modulator array |
| 88 | line of light |
| 90 | screen |
| 92 | half-wave plate |
| 95 | quarter-wave plate |
| 96 | polarization beam splitter |
| 97 | stop |
| 98 | beam divider |
| 100 | color combining cube |

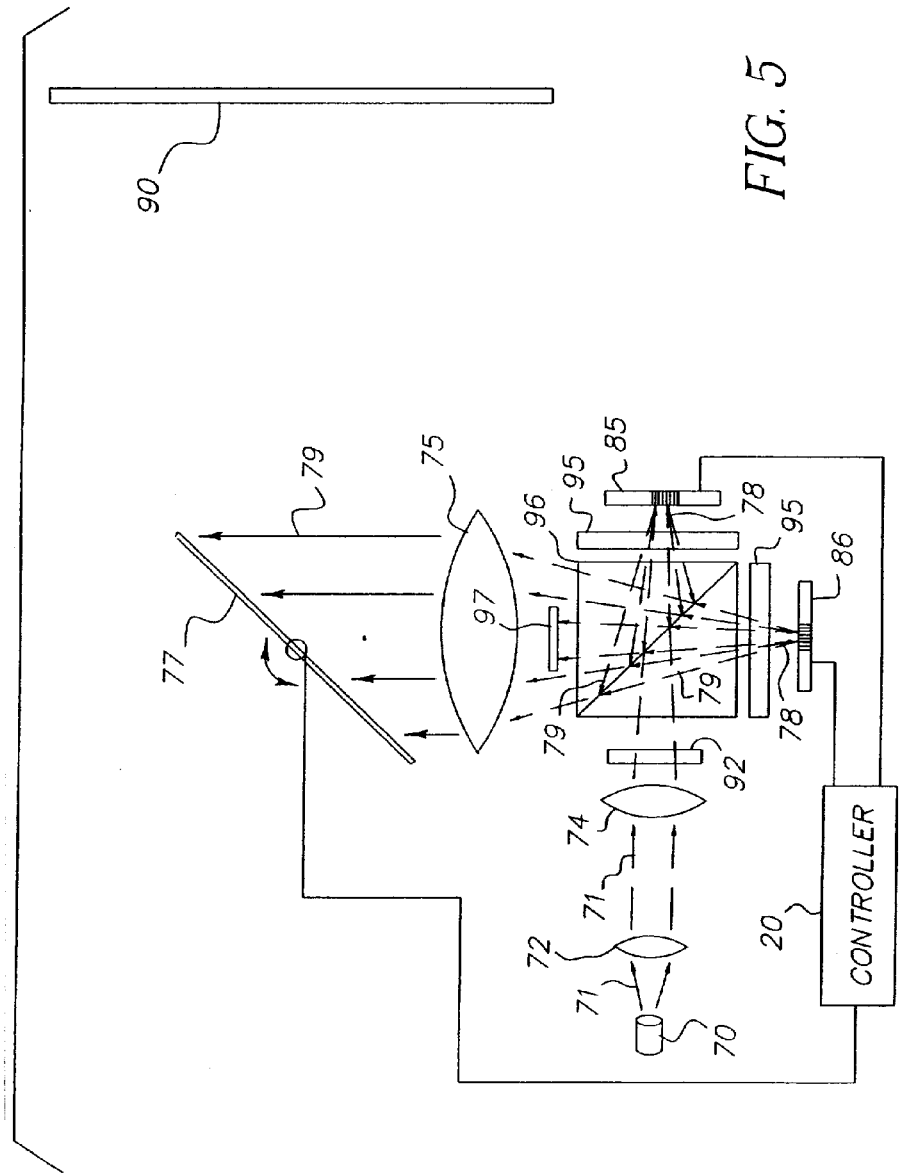

What is claimed is:

1. A method for forming an image with enhanced gray levels, comprising the steps of:
   a) providing a primary beam of light having a primary intensity value;
   b) providing a secondary beam of light having a secondary intensity value significantly less than the primary intensity value;
   c) receiving the primary beam of light at a first modulator array of discrete devices;
   d) producing an output with coarse gray levels with the first modulator array of discrete devices;
   e) receiving the secondary beam of light at a second modulator array of discrete devices;
   f) producing an output with fine gray levels with the second modulator array of discrete devices.
   g) synchronously controlling the first and the second modulator array; and
   h) combining the output with fine gray levels and the output with coarse gray levels to form the image with enhanced gray levels.

2. The method claimed in claim 1, wherein the step of synchronously controlling the first and the second modulator array includes the steps of
   g1) receiving image data with enhanced gray levels; and
   g2) separating the image data to produce the output with the coarse gray levels and the output with the fine gray levels.

3. The method claimed in claim 1, wherein the first and the second modulator array modulate incident light on a linear scale such that a separation between adjacent gray levels is a constant value.

4. The method claimed in claim 1, wherein the coarse and the fine gray levels are derived from pulse width modulation.

5. A method for forming an image with enhanced gray levels, comprising the steps of:
   a) choosing a state of polarization of a polarized light beam,
   b) dividing the polarized light beam unequally, based on the chosen polarization, into a primary beam of light having a primary intensity value, and a secondary beam of light having a secondary intensity value significantly less than the primary intensity value;
   c) receiving the primary beam of light at a first modulator array of discrete devices;
   d) producing an output with coarse gray levels with the first modulator array of discrete devices;
   e) receiving the secondary beam of light at a second modulator array of discrete devices;
   f) producing an output with fine gray levels with the second modulator array of discrete devices;
   g) synchronously controlling the first and the second modulator array; and
   h) combining the output with fine gray levels and the output with coarse gray levels to form the image with enhanced gray levels.

6. The method claimed in claim 5, wherein the step of choosing the state of polarization of a polarized light beam, further includes the step of:
   a1) selecting an orientation of a waveplate.

7. The method claimed in claim 5, wherein the step of synchronously controlling the first and the second modulator array includes the steps of:
   g1) receiving image data with enhanced gray levels; and
   g2) separating the image data to produce the output with coarse gray levels and the output with fine gray levels.

8. The method claimed in claim 5, wherein the first and the second modulator array modulate incident light on a linear scale such that a separation between adjacent gray levels is a constant value.

9. The method claimed in claim 5, wherein the coarse and the fine gray levels are derived from pulse width modulation.

* * * * *

UNITED STATES PATENT AND TRADEMARK OFFICE
CERTIFICATE OF CORRECTION

PATENT NO.     : 6,552,855 B1
DATED          : April 22, 2003
INVENTOR(S)    : Marek W. Kowarz et al.

It is certified that error appears in the above-identified patent and that said Letters Patent is hereby corrected as shown below:

The Title page showing an Illustrative figure should be deleted and substitute therefore the attached title page.

Delete drawing sheet(s) 1-10, and substitute therefore the drawing sheet(s) consisting of Fig(s) 1-9 as shown on the attached pages.

Signed and Sealed this

Sixteenth Day of September, 2003

JAMES E. ROGAN
*Director of the United States Patent and Trademark Office*

(12) United States Patent (10) Patent No.: US 6,552,855 B1
Kowarz et al. (45) Date of Patent: Apr. 22, 2003

(54) IMAGE-FORMING SYSTEM WITH ENHANCED GRAY LEVELS

(75) Inventors: Marek W. Kowarz, Henrietta, NY (US); John C. Brazas, Jr., Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/184,280

(22) Filed: Jun. 27, 2002

Related U.S. Application Data

(62) Division of application No. 09/993,034, filed on Nov. 6, 2001.

(51) Int. Cl.[7] .................................................. G02B 27/10
(52) U.S. Cl. ........................................ 359/627; 359/618
(58) Field of Search .................................. 359/618, 627, 359/385, 387, 485, 487, 483; 382/162, 199, 181; 348/625, 252

(56) References Cited

U.S. PATENT DOCUMENTS 6,222,674 B1 * 4/2001 Ohta .......................... 359/618

* cited by examiner

*Primary Examiner*—Georgia Epps
*Assistant Examiner*—Omar Hindi
(74) *Attorney, Agent, or Firm*—Stephen H. Shaw

(57) ABSTRACT

An image-forming system with enhanced gray levels, including: a primary beam of light having a primary intensity value; a secondary beam of light having a secondary intensity value significantly less than the primary intensity value; a first modulator array of discrete devices receiving the primary beam of light and producing an output with coarse gray levels; a second modulator array of discrete devices receiving the secondary beam of light and producing an output with fine gray levels; a controller for synchronously controlling the first and the second modulator array; and optics that combine the output with fine gray levels and the output with coarse gray levels to form an image with the enhanced gray levels.

9 Claims, 10 Drawing Sheets

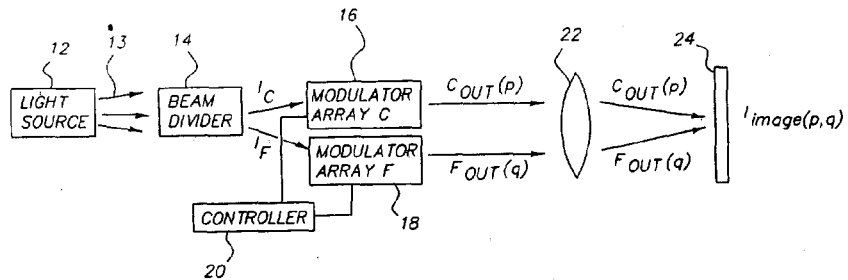

FIG. 1